June 29, 1965 R. J. ROBBINS ETAL 3,191,699
CUTTING WHEEL FOR ROCK DRILLING MACHINE
Filed Feb. 18, 1963 2 Sheets-Sheet 1

INVENTORS
RICHARD J. ROBBINS
DOUGLAS F. WINBERG
BY
Barnes + Seed

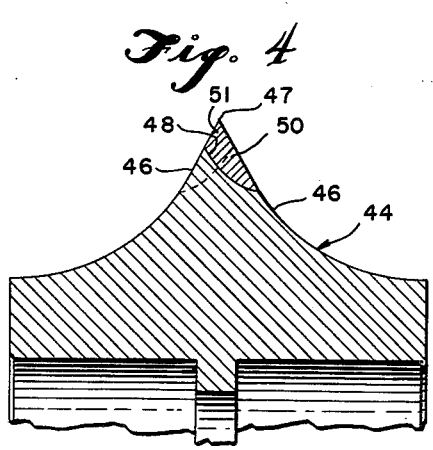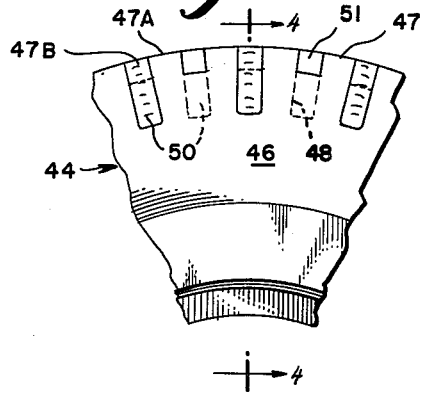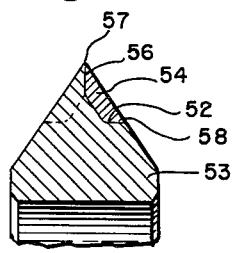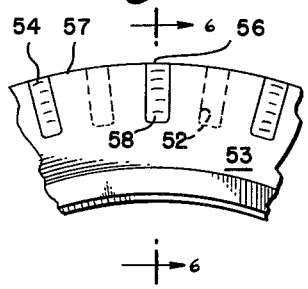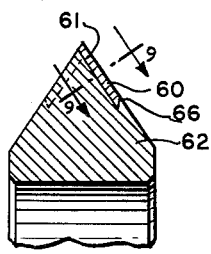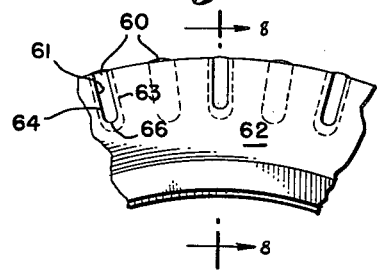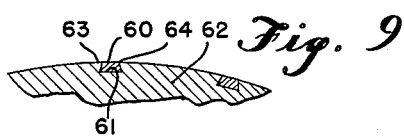
INVENTORS
RICHARD J. ROBBINS
DOUGLAS F. WINBERG
BY Barns + Seed

United States Patent Office 3,191,699
Patented June 29, 1965

3,191,699
CUTTING WHEEL FOR ROCK DRILLING MACHINE
Richard J. Robbins, Seattle, and Douglas F. Winberg, Bellevue, Wash., assignors to James S. Robbins & Associates, Inc., Seattle, Wash., a corporation of Washington
Filed Feb. 18, 1963, Ser. No. 259,273
5 Claims. (Cl. 175—374)

This invention relates to cutting wheels for a machine designed to bore tunnels of relatively large diameter, the cutting wheels being intended for use with a machine which travels progressively into the ground strata being bored as its large rotary head cuts a passage in the rocks. It is believed clarity in an understanding of the features of the cutter wheels to which the present application is articularly directed will be advanced by here cursorily describing the general nature of the boring machine.

The machine provides a relatively large body portion having a diameter moderately less than the tunnel which is to be bored, and desirably has a length greater than its diameter. There are mounted on the body of this machine a plurality of shoes arranged to be pressed outwardly so as to grip the side wall of the tunnel. By retracting one pair of diametrically opposed shoes from the tunnel wall, moving this pair of shoes forward, and then again pressing the latter shoes outwardly to take a new grip on the tunnel wall, the machine is able to "walk" along the length of the tunnel.

A large circular head is mounted at the front of the body for rotary motion about the longitudinal axis of the machine. Such head has a front plate which faces the end wall of the tunnel from which the rock is being cut. This head carries a plurality of outrigger bucket members which are evenly spaced along the circumference of the head. As the head rotates, the bucket members follow a circular path along the circumference of the end wall of the tunnel and act to scoop up rock and other debris cut from the end wall of the tunnel and carry it to the top of the machine. Here the buckets discharge the debris onto a rearwardly traveling conveyor which carries the debris to the rear of the machine.

The front plate has a considerable number of the cutting wheels mounted thereon, and cutting wheels are also mounted on the outrigger bucket members. Each wheel is journaled for free rotation and has its side faces tapering outwardly to produce a circumferential cutting edge.

The cutting wheels are spaced both radially and circumferentially with respect to the head's rotary axis, and each of the several wheels which are carried by the face plate, and also some of the bucket-carried wheels, is so mounted that its axis of rotation passes through the axis of rotation of the head at a point slightly forward of the face plate. These are usually termed the "forward facing" cutters. As the machine pushes forward from its shoe mounts, the circumferential cutting edge of each of these forward-facing cutters bears against the end face of the tunnel, and by virtue of the rotary motion of the head rolls against the rock so as to cut a plurality of circular kerfs therein.

Distinguished from said forward facing cutters, some of the wheels which lie proximal to the outer edge of the head have their respective cutting edges directed forwardly and outwardly at various angles and serve to shape the side walls of the tunnel by cutting kerfs in the circumferential "corner" of the tunnel, namely where the side and end walls of the tunnel meet. These shaping wheels are commonly termed "gauge" cutters. The outermost of these gauge cutters has its cutting edge extending laterally and slightly forward so that it cuts a generally helical kerf in the tunnel side wall.

As each forward-facing cutter deepens its kerf by chipping away relatively small pieces of adjacent rock, the divergent side faces of the wheel press in wedge-like fashion into the walls of the kerf to fracture the rock along planes reaching from each kerf into the rock. Since as herebefore stated, the wheels which cut adjacent kerfs are spaced circumferentially as well as radially with respect to one another, any one portion of the rock between such adjacent kerfs which are being cut in the end wall is pressed only by a single cutter at any one time so that the fracturing action is exerted first from the kerf on one side of this rock portion and then from the other. As the pieces of rock break away and fall to the floor of the tunnel, the same are scooped up by the buckets and dumped onto the aforementioned conveyor for removal to the rear of the steadily advancing machine.

The resistance of the rock to such cutting necessarily abrades or wears away the cutter portions which contact the rock so as to dull the circumferential cutting edge and wear away the side portions of the cutting wheel which form such edge so as to lessen the ability of the wheel to form its kerf. Also rather severe thrust loads are exerted at various angles against the rock contacting portions of the wheel to cause damage thereto. The reasons for such varying thrust loads are several. The rock structure through which the machine must bore, even in localized areas, can vary greatly in its resistance to cutting, and the rock body, if it is stratified or has been previously fractured, exhibits greater resistance to cutting along one axis than another. Also even with a fairly uniform rock structure, the manner in which the cutters work wedge-fashion into the kerf in the performance of their fracturing function generally results in rock at one side of the kerf giving way while rock at the other side may still remain intact.

Having the foregoing problems in mind it is the principal object of the invention to devise for a tunnel-boring machine of the type described a freely rotating cutting wheel improved with respect to the prior art in being better able to maintain a properly sharp and properly aligned cutting edge, to resist wear from the abrading action of the rock, and to withstand the various thrust loads exerted upon the wheel from the rock surface being cut.

These and other more particular objects and advantages will, together with the general object appear and be understood in the course of the following description and claims, the invention consisting in the novel construction and in the adaptation and combination of parts hereinafter described and claimed.

FIGS. 3, 5 and 7 are fragmentary enlarged-scale side elevational views each detailing a respective one of three embodiments of the cutter's cutting wheel.

Figure 1:
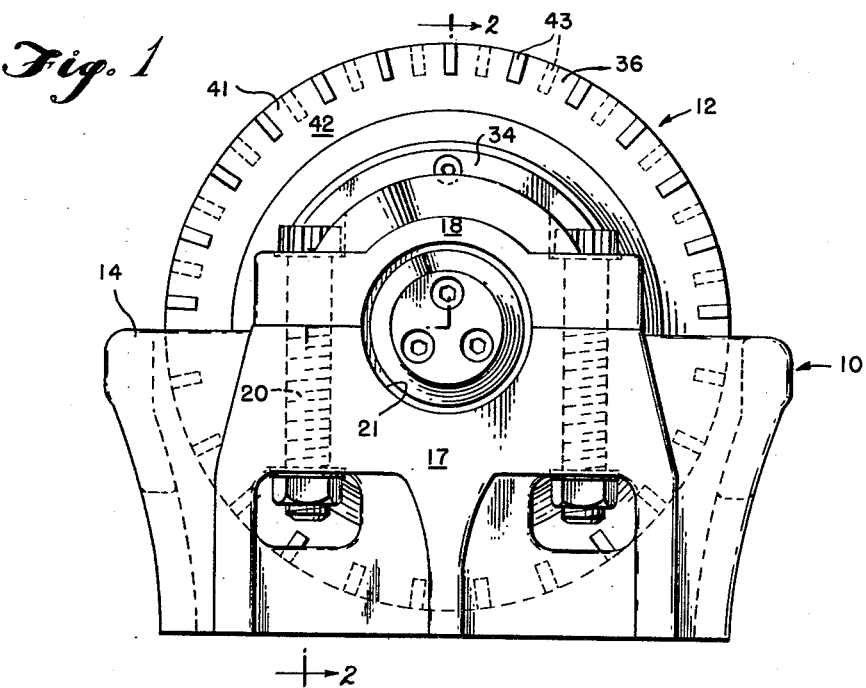
FIGURE 1 is a side elevational view illustrating a cutter of the type to which the present invention pertains.

FIGS. 4, 6 and 8 are fragmentary transverse vertical sectional views taken on lines 4—4 of FIG. 3, 6—6 of FIG. 5, and 8—8 of FIG. 7, respectively.

FIG. 9 is a fragmentary sectional view taken to an enlarged scale on line 9—9 of FIG. 8.

Referring to said drawings, the numeral 10 designates a split block supporting the ends of a non-rotary shaft 11. A cutting wheel 12 is carried for rotary motion by the shaft. The base 17 of the block is adapted to be welded or otherwise rigidly secured to the rotary head of the boring machine. The axis of the shaft 11 traverses the rotary axis of the cutting head to enable the cutting wheel 12 to roll against the rock face being cut so as to form its kerf in the aforedescribed manner.

Viewed from above the base of the pillow block has a box configuration, so that end walls 17 on which the shaft seats are joined by side walls 14. Facing saddle notches provided by each of said end walls and cap complements 18 secured by bolts 20 thereto have a mounting sleeve 22 clamped therein. Related ends of the shaft 11 are made fast to the sleeves by means of drawbolts 19 working against thrust caps 15. Spacers 27 lie to the inside of the mounting sleeves, and the inner races 23 for two sets of roller bearings 24 bear against the spacers. The outer races 26 carry the cutting wheel 12. The bearings are sealed at each end by paired O-rings 31 and 32 fitting over metallic tapered rings 28 and 30 contained one by a retainer 34 which is fixed to the wheel and the other by an inner prolongation 33 of a related mounting sleeve 22.

The wheel 12 comprises an inner hub member 37 and a replaceable outer ring 36 press-fitted thereon. The ring performs the kerf-cutting and fracturing action upon the end wall of a tunnel being bored. The ring, when applied to the hub, is brought to bear against a shoulder 38.

Considered in transverse section, the ring has much the shape of an isosceles triangle, so that the two sides 42 slope in a corresponding degree from an apex 41 which is, perforce, the cutting edge of the ring 36. The cutting edge has a plurality of relatively hard tooth members 43 embedded therein to occupy positions spaced at equal intervals alternately on each side of such edge. The configuration and arrangement of these tooth members is significant to the present invention. Three embodiments thereof are shown in FIGS. 3 through 9.

In FIGS. 3 and 4 the wheel, here designated by 44, is itself modified in that the ring and hub components are made integral. Each of the bevelled side walls 46, in the area of the cutting edge 47, are radially milled in a manner to produce a plurality of slots 48 evenly spaced along the circumference of the wheel 44 and placed so as to occur alternately with respect to the two sides 46. The milling removes a portion of the cutting edge 47, and the produced cavities have a considerably greater length measured in the plane of the front wall than the back wall. Tooth members 50 are formed by filling each of the cavities 48 with a weld material impregnated with carbide particles. Exposed front and back faces of the teeth are or may be finished flush with side faces 46 of the wheel. The tip 51 of each tooth would in such case lie flush with the cutting edge 47 but may, if desired, be moderately arched so as to protrude in a slight degree. The weld material which forms the tooth, when inserted in its cavity 48, fuses with the adjacent material of the wheel 44 so as to bond integrally therewith.

FIGS. 5 and 6 illustrate an embodiment in which the cavities 52 are cast in the ring member 53 to provide a different shape from that which milling permits. The cavities 52 are filled by carbide-impregnated weld material in the same manner as in the previous embodiment, producing teeth 54 which differ from the teeth 50 in that the tooth has a face exposed to only one of the flanks of the ring 53, and the base 58 of each tooth is flat and lies perpendicular to the plane in which the cutting edge lies.

In the embodiment of FIGS. 7 through 9, slots 61 are milled with a tool whose cutting portion has the configuration of a truncated cone, the result being a slot having a dove-tail configuration. Because of the resultant overhang of the ring member along the sides and at the base of the slot, as at 63, 64 and 66, each tooth 60 is consequently held more firmly in its related slot. This enables a material to be used which is harder yet than that used in the previous embodiments, such a material being, for example, pure carbide. When such a material is used, it is inserted as a piece already shaped according to the configuration of its related slot, and is bonded therein in a suitable manner.

Figure 2:
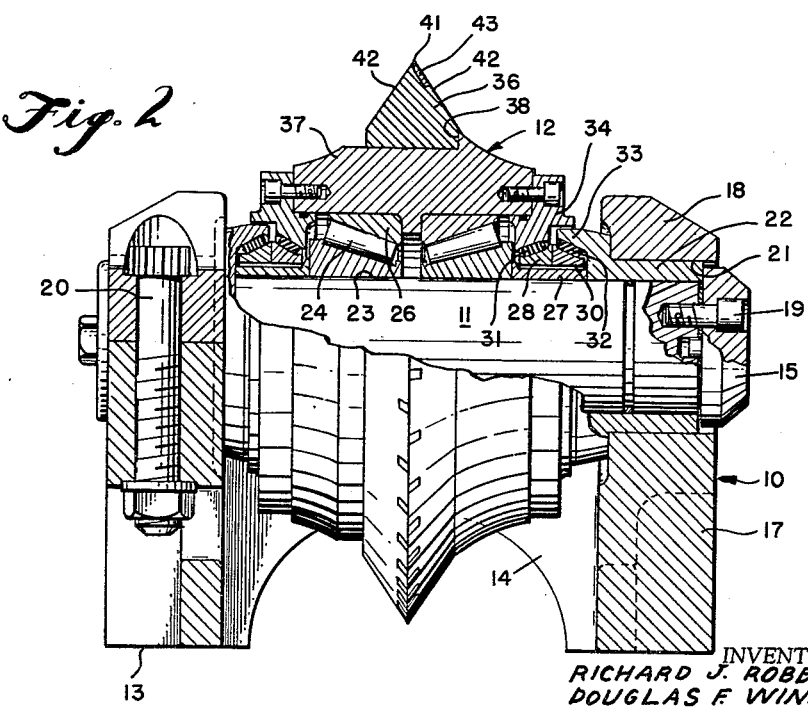
FIG. 2 is a view partly in elevation and partly in section along the jogged section line 2—2 of FIG. 1.

In operation, referring now specifically to the embodiment shown in FIGS. 3 and 4, as the rotary head (not shown) of the boring machine turns, the various wheels 44, each mounted in a related cutting unit (as shown in FIGS. 1 and 2), roll along the rock face being cut so that each wheel forms its kerf in the aforedescribed manner. Because the teeth 50 are more resistant to wear than the adjacent material of the wheel 44, the cutting edge portion 47a formed by the wheel material tends to wear away more quickly than the portion 47b formed by the teeth 50. After a moderate amount of such wear, the circumferential edge becomes formed as a moderately undulating ridge, with the tooth portions 47a being at the peaks of the undulations and the edge portions 47b forming the valleys. The tips 51 of the hard teeth, thus extending a very moderate distance beyond the edge portions 47b, prevent these latter relatively softer edges from becoming dull. Each tooth is recessed in a slot, and thus throughout the greater portion of the usable life of such teeth (i.e. as the same are worn down) the tips of the teeth continue to occupy a plane coinciding with that in which the edge 47b lies. This prevents the cutting edge from taking on a "zig-zag" or "saw-tooth" pattern, and improves the cutting action in that the cutting edge is able to "ride" a rather narrow groove in the rock.

The manner in which the rings of the second and third embodiments operate is much the same as that of the first embodiment, hence the above explanation in reference to FIGS. 3 and 4 is applicable to the other two illustrated embodiments. The determination as to which embodiment is most effective for a given operation depends upon the particular type of rock being cut, and giving consideration to the wearing or abrading action of the rock on the cutter, to the manner in which the rock fractures, to the nature of the thrust loads exerted by the rock on the cutter, as well as other factors.

It is thought that the invention will have been clearly understood from the foregoing detailed description. Changes will suggest themselves and may be resorted to without departing from the spirit of the invention, wherefore it is our intention that no limitations be implied and that the hereto annexed claims be given a scope fully commensurate with the broadest interpretation to which the employed language admits.

What we claim is:

1. In a cutter for a machine having a rotary head which bores into rock so as to form a tunnel therein, said head functioning to form in the rock surface being bored a plurality of circular kerfs so as to fracture rock between a proximate pair of said kerfs in a manner to cause rock fragments to be separated from the rock being bored, said cutter acting to form a related one of said kerfs, (a) a cutting wheel mounted on said cutter for rotary motion so as to be able to roll along the kerf being cut, said cutting wheel having a circumferential cutting edge and two circumferential outwardly tapering sides which form said cutting edge, said cutting edge with said outwardly tapering edge, said cutting edge with said outwardly tapering sides acting to form said kerf, the wheel providing a plurality of recesses in each of said tapering sides spaced at equidistant intervals of the circumference a distance greater than the maximum width of the recesses, each of said recesses being exposed to the side faces and being undercut along both lateral edges so that the recesses have a width in the plane of the side face narrower than the width in a paralleling plane which is removed inwardly therefrom, the recess in one side being staggered in relation to the recesses in the other side of the wheel, (b) a respective tooth occupying each of said recesses of said cutting wheel and being relatively hard with respect to the material of said cutting wheel, the tip of each tooth being at said circumferential cutting edge.

2. Structure according to claim 1 in which the recesses are also undercut along the bottom edge.

3. Structure according to claim 1 in which the material composing the teeth is fused to the material composing the wheel.

4. Structure according to claim 1 in which the teeth are pre-formed inserts.

5. Structure according to claim 4 in which the material composing the teeth is carbide.

References Cited by the Examiner
UNITED STATES PATENTS

| | | | |
|---|---|---|---|
| 1,516,340 | 11/24 | Holdaway et al. | 175—375 |
| 1,691,623 | 11/28 | Black | 175—375 |
| 2,121,202 | 6/38 | Killgore | 175—374 |
| 2,223,864 | 12/40 | Zublin | 175—375 |

BENJAMIN HERSH, *Primary Examiner.*

UNITED STATES PATENT OFFICE
CERTIFICATE OF CORRECTION

Patent No. 3,191,699

June 29, 1965

Richard J. Robbins et al.

It is hereby certified that error appears in the above numbered patent requiring correction and that the said Letters Patent should read as corrected below.

Column 4, lines 61 and 62, strike out "edge, said cuttin edge with said outwardly tapering"; same column 4, line 72, for "recess" read -- recesses --.

Signed and sealed this 30th day of November 1965.

(SEAL)
Attest:

ERNEST W. SWIDER
Attesting Officer

EDWARD J. BRENNER
Commissioner of Patents